(12) United States Patent
Notoya

(10) Patent No.: US 12,517,322 B2
(45) Date of Patent: Jan. 6, 2026

(54) ENDOSCOPE DEVICE, ENDOSCOPE SYSTEM, CONVERGENCE ANGLE CHANGING METHOD, AND COMPUTER-READABLE MEDIUM

(71) Applicant: Evident Corporation, Nagano (JP)

(72) Inventor: Mizuki Notoya, Nagano (JP)

(73) Assignee: Evident Corporation, Nagano (JP)

( * ) Notice: Subject to any disclaimer, the term of this patent is extended or adjusted under 35 U.S.C. 154(b) by 373 days.

(21) Appl. No.: 18/197,896

(22) Filed: May 16, 2023

(65) Prior Publication Data

US 2023/0418023 A1 Dec. 28, 2023

(30) Foreign Application Priority Data

Jun. 23, 2022 (JP) ................................. 2022-100755

(51) Int. Cl.
*G02B 23/24* (2006.01)
*A61B 1/00* (2006.01)
*G02B 7/18* (2021.01)
*G02B 7/28* (2021.01)
*H04N 23/50* (2023.01)
*H04N 23/55* (2023.01)

(52) U.S. Cl.
CPC ............ *G02B 7/18* (2013.01); *A61B 1/00183* (2013.01); *A61B 1/00193* (2013.01); *G02B 7/28* (2013.01); *G02B 23/2415* (2013.01); *G02B 23/243* (2013.01); *G02B 23/2484* (2013.01); *H04N 23/55* (2023.01); *H04N 23/555* (2023.01)

(58) Field of Classification Search
None
See application file for complete search history.

(56) References Cited

U.S. PATENT DOCUMENTS 3,520,587 A * 7/1970 Ouchi ................ G02B 23/2415
348/45
4,873,572 A * 10/1989 Miyazaki ............. H04N 13/189
348/E13.067
5,047,847 A * 9/1991 Toda ...................... H04N 23/75
349/1

(Continued)

FOREIGN PATENT DOCUMENTS

JP H0675175 A 3/1994
JP H07-152096 A 6/1995

(Continued)

OTHER PUBLICATIONS

Japanese Office Action dated Sep. 2, 2025 received in 2022-100755.

*Primary Examiner* — John P Leubecker
(74) *Attorney, Agent, or Firm* — Scully, Scott, Murphy & Presser, P.C.

(57) ABSTRACT

An endoscope device includes an imaging optical system including two incident light paths formed by two optical systems respectively having optical axes eccentric with respect to an imaging center of an imaging element, an optical action member configured to change a convergence angle, and a processor configured to control a state of the optical action member in the imaging optical system. The processor changes the convergence angle by controlling the state of the optical action member in the imaging optical system.

11 Claims, 16 Drawing Sheets

(56) References Cited

U.S. PATENT DOCUMENTS

| | | | | |
|---|---|---|---|---|
| 5,459,605 A * | 10/1995 | Kempf | ............... | A61B 1/055 |
| | | | | 359/476 |
| 5,490,015 A * | 2/1996 | Umeyama | ............ | H02N 2/025 |
| | | | | 359/813 |
| 5,940,171 A * | 8/1999 | Tocher | ............... | G02B 23/14 |
| | | | | 356/16 |
| 6,344,937 B1 * | 2/2002 | Sparrold | ............ | G02B 27/0025 |
| | | | | 359/211.2 |
| 6,987,529 B1 * | 1/2006 | Ito | ............... | G02B 7/102 |
| | | | | 348/208.7 |
| 7,190,389 B1 * | 3/2007 | Abe | ............... | H04N 13/246 |
| | | | | 348/E13.016 |
| 8,639,109 B2 * | 1/2014 | Aoki | ............... | H04N 23/959 |
| | | | | 348/47 |
| 9,736,344 B2 * | 8/2017 | Lim | ............... | H04N 23/54 |
| 2002/0022767 A1 * | 2/2002 | Dohi | ............... | G02B 5/06 |
| | | | | 600/137 |
| 2010/0208046 A1 | 8/2010 | Takahashi | | |
| 2010/0274089 A1 * | 10/2010 | Choi | ............... | A61B 90/30 |
| | | | | 600/166 |
| 2016/0266371 A1 * | 9/2016 | Jahromi | ............ | G02B 23/18 |
| 2016/0278636 A1 * | 9/2016 | Fukuma | ............ | A61B 3/132 |
| 2017/0351086 A1 * | 12/2017 | Takahashi | ......... | A61B 1/00101 |
| 2018/0270465 A1 * | 9/2018 | Bendall | ............ | G01N 21/954 |
| 2019/0053700 A1 * | 2/2019 | Tesar | ............... | G02B 21/368 |
| 2023/0221540 A1 * | 7/2023 | Liu | ............... | G02B 21/0012 |
| | | | | 359/372 |

FOREIGN PATENT DOCUMENTS

| | | |
|---|---|---|
| JP | H10174673 A | 6/1998 |
| JP | 2002090921 A | 3/2002 |
| JP | 2006-136706 A | 6/2006 |
| JP | 2010-128354 A | 6/2010 |
| JP | 2010139672 A | 6/2010 |
| JP | 4885479 B2 | 2/2012 |
| JP | 2020012896 A | 1/2020 |
| WO | WO-2014147856 A1 * | 9/2014 ............ H04N 23/55 |

* cited by examiner

ENDOSCOPE DEVICE, ENDOSCOPE SYSTEM, CONVERGENCE ANGLE CHANGING METHOD, AND COMPUTER-READABLE MEDIUM

CROSS REFERENCE TO RELATED APPLICATIONS

This application is based upon and claims the benefit of priority of the prior Japanese Patent Application No. 2022-100755, filed Jun. 23, 2022, the entire contents of which are incorporated herein by reference.

BACKGROUND OF THE INVENTION

Field of the Invention

The disclosure of the present specification relates to an endoscope device, an endoscope system, a convergence angle changing method, and a computer-readable medium.

Description of the Related Art

As one of the functions of an endoscope device, a stereo measurement function is known. The stereo measurement function is a function of capturing an image of a measurement target portion from two directions having parallax, obtaining a deviation amount of a corresponding measurement point on each image by correlation calculation between the captured images, and measuring a size, a depth, and the like of an object from the obtained deviation amount based on the principle of triangulation. In such a stereo measurement function, since an overlapping area of respective visual fields of two images having parallax becomes a measurable area, the measurement target portion needs to be included in the respective visual fields.

As an optical system configured to capture images of two images having parallax, for example, a compound eye imaging system described in JP H07-152096 A is known. The compound eye imaging system includes, for example, a prism system on the subject side as a means configured to change a convergence angle, and changes the convergence angle by rotating a prism forming the prism system.

SUMMARY OF THE INVENTION

An endoscope device according to an aspect of the present invention includes: an imaging optical system including two incident light paths formed by two optical systems respectively having optical axes eccentric with respect to an imaging center of an imaging element; an optical action member configured to change a convergence angle; and a processor configured to control a state of the optical action member in the imaging optical system, in which the processor measures a distance to a subject, and changes, based on a measurement result, the convergence angle by controlling the state of the optical action member in the imaging optical system.

An endoscope system according to an aspect of the present invention is an endoscope system including an endoscope device and a control device. The endoscope device includes an imaging optical system including two incident light paths formed by two optical systems respectively having optical axes eccentric with respect to an imaging center of an imaging element, and an optical action member configured to change a convergence angle. The control device measures a distance to a subject, and changes, based on a measurement result, the convergence angle by controlling a state of the optical action member in the imaging optical system.

A convergence angle changing method according to an aspect of the present invention includes: measuring a distance to a subject; and changing a convergence angle by controlling, based on the distance, a state of an optical action member in an imaging optical system including two incident light paths formed by two optical systems respectively having optical axes eccentric with respect to an imaging center of an imaging element.

A computer-readable medium according to an aspect of the present invention is a non-transitory computer-readable medium having a program stored therein and configured to cause a processor to execute processing of measuring a distance to a subject, and changing a convergence angle by controlling, based on the distance, a state of an optical action member in an imaging optical system including two incident light paths formed by two optical systems respectively having optical axes eccentric with respect to an imaging center of an imaging element.

Another endoscope device according to an aspect of the present invention includes: an imaging optical system including two incident light paths formed by two optical systems respectively having optical axes eccentric with respect to an imaging center of an imaging element; at least one optical action member configured to change a convergence angle, the optical action member being insertable into and removable from one or each of the two incident light paths; and a processor configured to control an insertion/removal state of the optical action member in the imaging optical system, the processor being configured to change the convergence angle by changing the insertion/removal state of the optical action member.

DESCRIPTION OF THE EMBODIMENTS

In a conventional endoscope device including a stereo measurement function, since a convergence angle is fixed, the ratio of a measurable area in which visual fields of two images having parallax overlap with each other changes according to a subject distance (distance to the subject).

Figure 16:
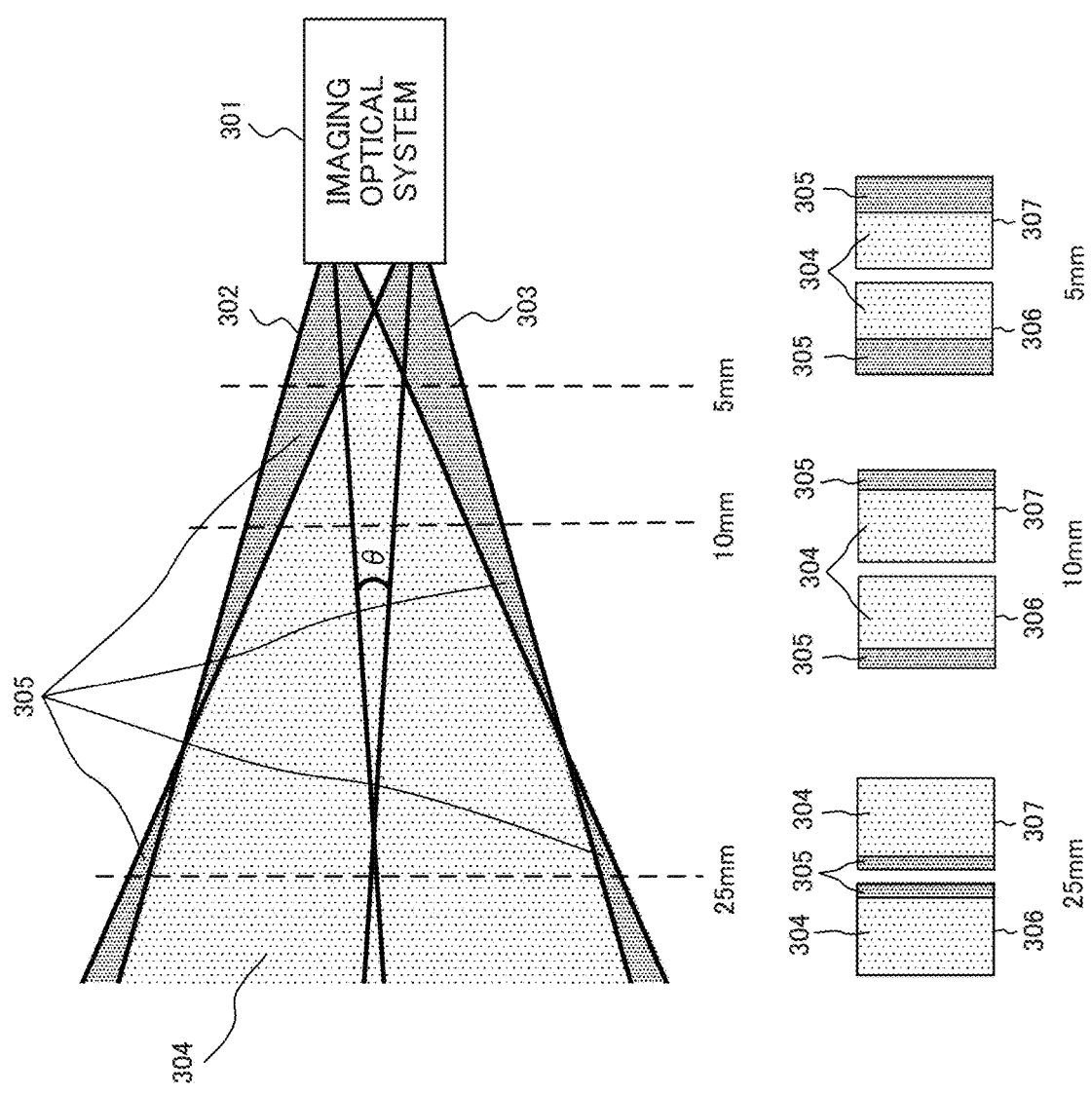
FIG. 16 is a diagram illustrating an example in which the ratio of a measurable area changes according to a subject distance in a conventional endoscope device.

FIG. 16 is a diagram illustrating an example in which the ratio of a measurable area changes according to a subject distance in a conventional endoscope device. In this example, an area in which two visual fields 302 and 303 of an imaging optical system 301 having a fixed convergence angle θ overlaps each other becomes a measurable area 304, and an area in which the two visual fields do not overlap each other becomes a non-measurable area 305. In this case, the ratio of the measurable area in the images of the two visual fields 302 and 303 (two images having parallax) captured through the imaging optical system 301 changes according to a subject distance. FIG. 16 illustrates, as an example, the measurable area 304 and the non-measurable area 305 in images 306 and 307 of the two visual fields 302 and 303 in which subjects, the subject distances of which are respectively 5 mm, 10 mm, and 25 mm, are imaged. According to these images 306 and 307, the ratio of the measurable area 304 in the images 306 and 307, the subject distance of which is 5 mm, is smaller than that of the measurable area 304 in the images 306 and 307, the subject distance of which is 10 mm, and the ratio of the measurable area 304 in the images 306 and 307, the subject distance of which is 25 mm, is larger than the above-described two ratios.

As described above, since the convergence angle is fixed in the conventional endoscope device, the ratio of the measurable area changes according to the subject distance. Therefore, the ratio of the measurable area decreases according to the subject distance (for example, in the case of the subject distance of 5 mm in FIG. 16), and usability of the stereo measurement function deteriorates.

It is noted that JP H07-152096 A discloses a compound eye imaging system including a means configured to change a convergence angle, but the same does not disclose any technology for changing the convergence angle according to a subject distance.

An embodiment of the present invention will be described below with reference to the drawings.

First Embodiment

Figure 1:
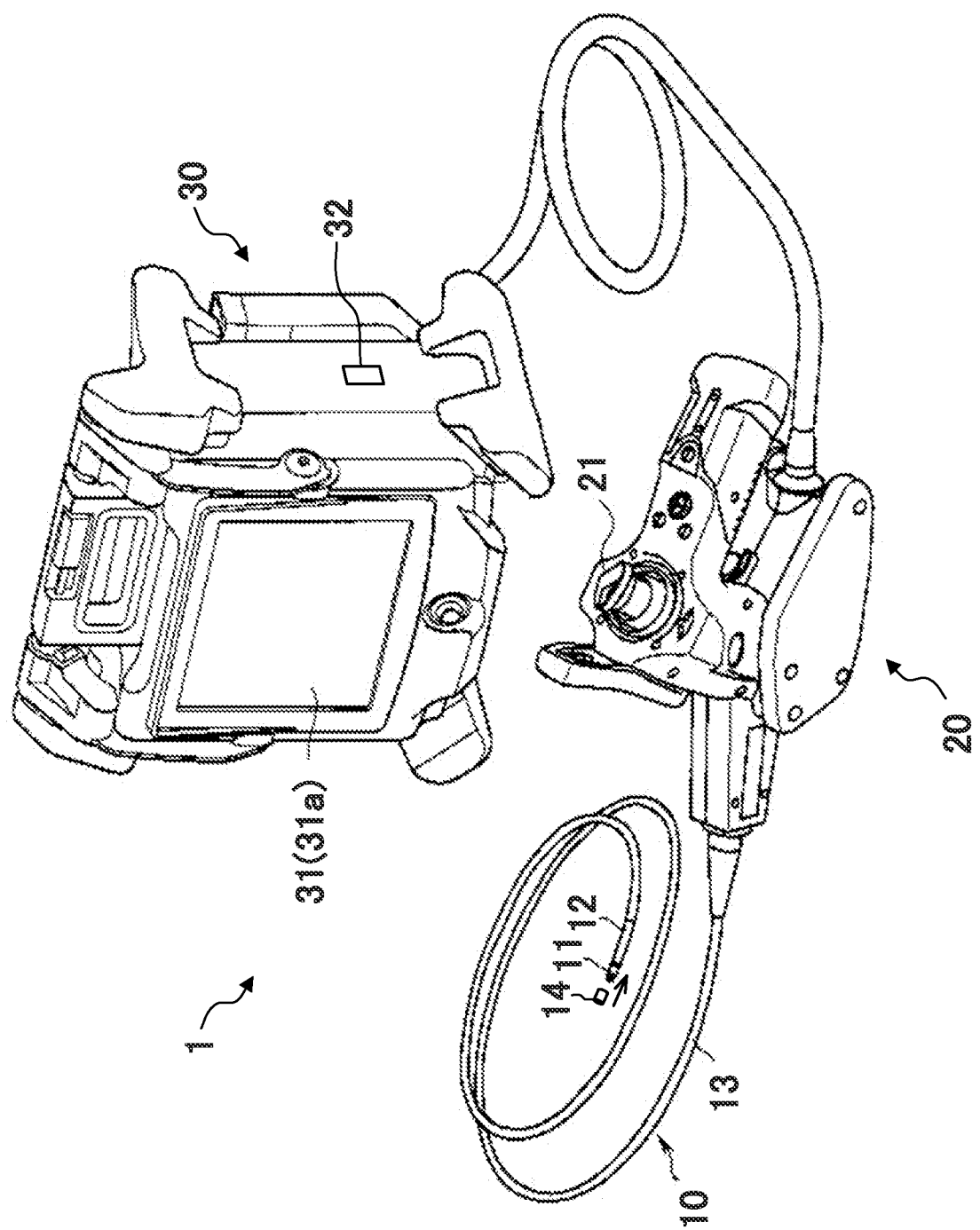
FIG. 1 is a diagram illustrating an external configuration of an endoscope device according to a first embodiment.

FIG. 1 is a diagram illustrating an external configuration of an endoscope device 1 according to a first embodiment. The endoscope device 1 illustrated in FIG. 1 is an endoscope device having a stereo measurement function, and the same includes an insertion unit 10, an operation unit 20, and a main body unit 30.

The insertion unit 10 has an elongated shape that can be inserted into the inside of a subject, and includes a distal end portion 11, a bending portion 12 formed to be bendable, and an elongated flexible tube portion 13 having flexibility. As indicated by an arrow, an optical adapter 14 can be detachably mounted on the distal end portion 11. By mounting the optical adapter 14 on the distal end portion 11, the endoscope device 1 can perform measurement by a stereo measurement function.

The operation unit 20 receives a user's operation, and includes a joystick 21, a plurality of buttons (not illustrated), and the like. The joystick 21 is a bending operator configured to receive an operation for bending the bending portion 12 in a desired direction.

The main body unit 30 includes a display unit 31, an external interface 32, and the like. The display unit 31 is a display device such as a liquid crystal display (LCD), and displays an image, an operation screen, and the like. In addition, the display unit 31 includes a touch panel 31a that receives a user's touch operation. An external device such as an external storage device (for example, a universal serial bus (USB) memory) is connected to the external interface 32.

Figure 2:
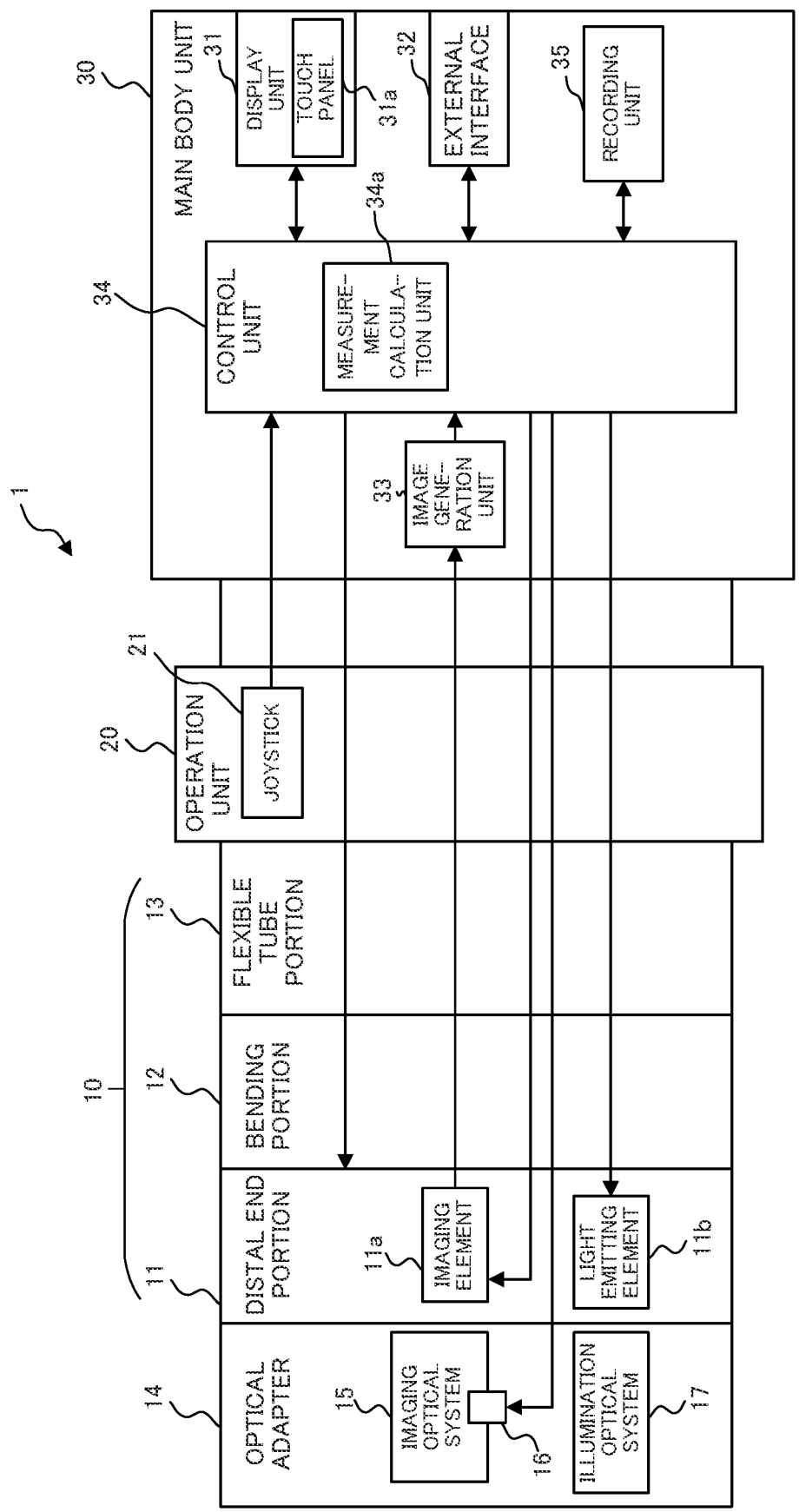
FIG. 2 is a diagram illustrating an internal configuration of the endoscope device according to the first embodiment.

FIG. 2 is a diagram illustrating an internal configuration of the endoscope device 1 according to the first embodiment. In the endoscope device 1 illustrated in FIG. 2, the optical adapter 14 and the distal end portion 11 in a state where the optical adapter 14 is mounted on the distal end portion 11 include an imaging optical system 15, an optical action member 16, an imaging element 11a, a light emitting element 11b, and an illumination optical system 17.

As will be described in detail below, the imaging optical system 15 has two incident light paths formed by two optical systems, the optical axes of which are eccentric with respect to the imaging center of the imaging element 11a. When the long side direction of the imaging area of the imaging element 11a is defined as the left-and-right direction, such an imaging optical system 15 simultaneously forms subject images having parallax in each of the left half and right half areas of the imaging area. As will be described in detail below, the optical action member 16 changes a convergence angle.

The imaging element 11a captures (photoelectrically converts) the subject image formed by the imaging optical system 15 to generate an imaging signal, and outputs the imaging signal to the main body unit 30 (image generation unit 33). The imaging element 11a is a charge coupled device (CCD) image sensor, a complementary metal oxide semiconductor (CMOS) image sensor, or the like.

The light emitting element 11b emits illumination light for illuminating the subject. The light emitting element 11b is a light emitting diode (LED) or the like. The illumination optical system 17 irradiates the subject with the illumination light emitted from the light emitting element 11b. It is noted that, here, the subject is illuminated with the illumination light emitted from the light emitting element 11b, but for example, the subject may be illuminated by guiding illumination light emitted from a light source unit provided in the main body unit 30 with a light guide inserted through the insertion unit 10 or the like.

The operation unit 20 receives a user's operation with respect to the joystick 21, the plurality of buttons (not illustrated), and the like, and outputs a signal corresponding to the operation to the main body unit 30 (the control unit 34).

The main body unit 30 includes the image generation unit 33, the control unit 34, and a recording unit 35 in addition to the display unit 31 and the external interface 32 described above. It is noted that the touch panel 31*a* provided in the display unit 31 receives a user's touch operation and outputs a signal corresponding to the touch operation to the control unit 34.

The image generation unit 33 generates an image by performing predetermined signal processing on the imaging signal output from the imaging element 11*a*, and sequentially outputs the generated images to the control unit 34. The image generation unit 33 includes, for example, an image generation circuit.

The control unit 34 controls each unit of the endoscope device 1. For example, the control unit 34 controls driving of the imaging element 11*a* and the light emitting element 11*b*, controls display of the display unit 31, controls bending of the bending portion 12 in response to a user's operation with respect to the joystick 21, and controls the state of the optical action member 16 in the imaging optical system 15.

In addition, the control unit 34 performs various types of processing. For example, the control unit 34 displays the images sequentially output from the image generation unit 33 on the display unit 31, or records the images as a still image or a moving image in the recording unit 35 or in an external storage device connected to the external interface 32. Furthermore, for example, the control unit 34 performs measurement processing by the stereo measurement function based on the image output from the image generation unit 33.

In addition, the control unit 34 includes a measurement calculation unit 34*a*. The measurement calculation unit 34*a* measures a subject distance (a distance from the distal end of the optical adapter 14 mounted on the distal end portion 11 to the subject) based on the image output from the image generation unit 33. The subject distance at this time can be measured by a known method (for example, the method described in JP 2006-136706 A) using the principle of triangulation. Then, the control unit 34 changes a convergence angle by controlling the state of the optical action member 16 in the imaging optical system 15 based on the measurement result of the measurement calculation unit 34*a*.

The above-described control unit 34 is configured to include, for example, a processor such as a central processing unit (CPU), a random access memory (RAM), and a read only memory (ROM). Then, the processor executes a program stored in the ROM while using the RAM as a work area or the like, thereby implementing the function of the control unit 34. The control unit 34, or the control unit 34 and the image generation unit 33 may be configured by hardware such as an application specific integrated circuit (ASIC) or a field programmable gate array (FPGA).

The recording unit 35 records a still image, a moving image, a measurement result, and the like. The recording unit 35 may record a program executed by the processor of the control unit 34. The recording unit 35 is a nonvolatile memory such as a hard disk drive (HDD) or a solid state drive (SSD).

Figure 3:
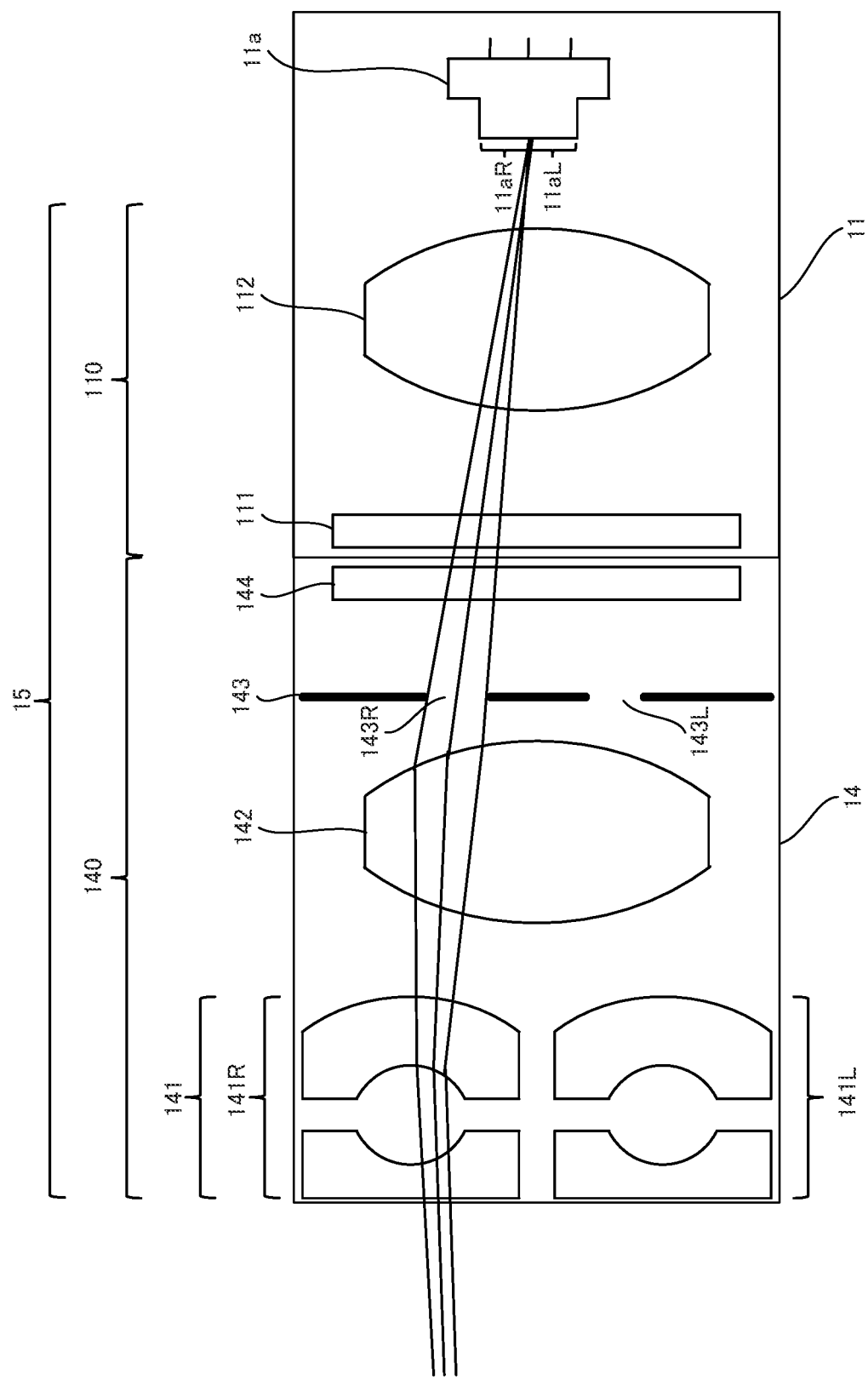
FIG. 3 is a diagram illustrating a configuration of an imaging optical system.

FIG. 3 is a diagram illustrating a configuration of the imaging optical system 15. As illustrated in FIG. 3, the imaging optical system 15 includes an adapter optical system 140 included in the optical adapter 14 and a master optical system 110 included in the distal end portion 11. The adapter optical system 140 includes a binocular lens 141 including a left-eye lens 141L and a right-eye lens 141R each having negative lens power, a coaxial lens 142 having positive lens power, a diaphragm (brightness diaphragm) 143, and a cover glass 144. The left-eye lens 141L and the right-eye lens 141R are two optical systems, the optical axes of which are eccentric with respect to the imaging center of the imaging element 11*a*, and the imaging optical system 15 has two incident light paths (incident light paths from the subject to the imaging element 11*a*) formed by the left-eye lens 141L and the right-eye lens 141R. The diaphragm 143 has two opening portions 143L and 143R disposed corresponding to two incident light paths. The master optical system 110 includes a cover glass 111 and a coaxial lens 112 having positive lens power.

In the above-described imaging optical system 15, light that has sequentially passed through, from the subject, the right-eye lens 141R, the coaxial lens 142, the opening portion 143R of the diaphragm 143, the cover glass 144, the cover glass 111, and the coaxial lens 112 forms an image in a left-half area 11*a*L of the imaging area of the imaging element 11*a*. In addition, light that has sequentially passed through, from the subject, the left-eye lens 141L, the coaxial lens 142, the opening portion 143L of the diaphragm 143, the cover glass 144, the cover glass 111, and the coaxial lens 112 forms an image in the right-half area 11*a*R of the imaging area of the imaging element 11*a*. That is, the lights from the two incident light paths (two subject images having parallax) are simultaneously imaged on the left-half area 11*a*L and the right-half area 11*a*R of the imaging area of the imaging element 11*a*. Hereinafter, in the two incident light paths, an incident light path passing through the right-eye lens 141R and the like is referred to as a first incident light path, and an incident light path passing through the left-eye lens 141L and the like is referred to as a second incident light path.

Next, the optical action member 16 will be described. In the first embodiment, the optical action member 16 is configured to be insertable into and removable from the first incident light path in the imaging optical system 15. Insertion and removal at this time are performed by an actuator (not illustrated) included in the optical adapter 14 under the control of the control unit 34.

Figure 4:
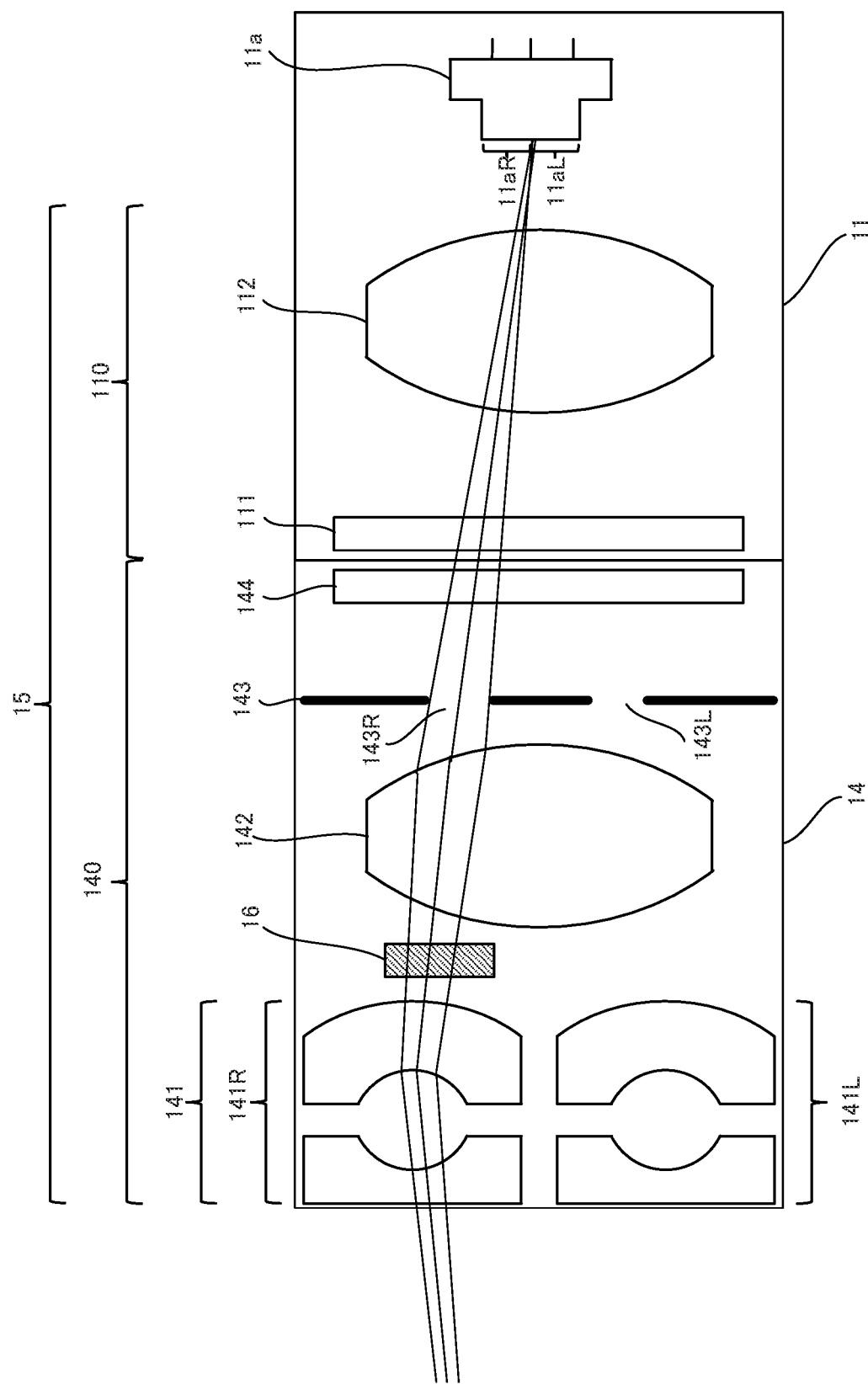
FIG. 4 is a diagram illustrating an arrangement example of an optical action member inserted into a first incident light path.
Figure 5:
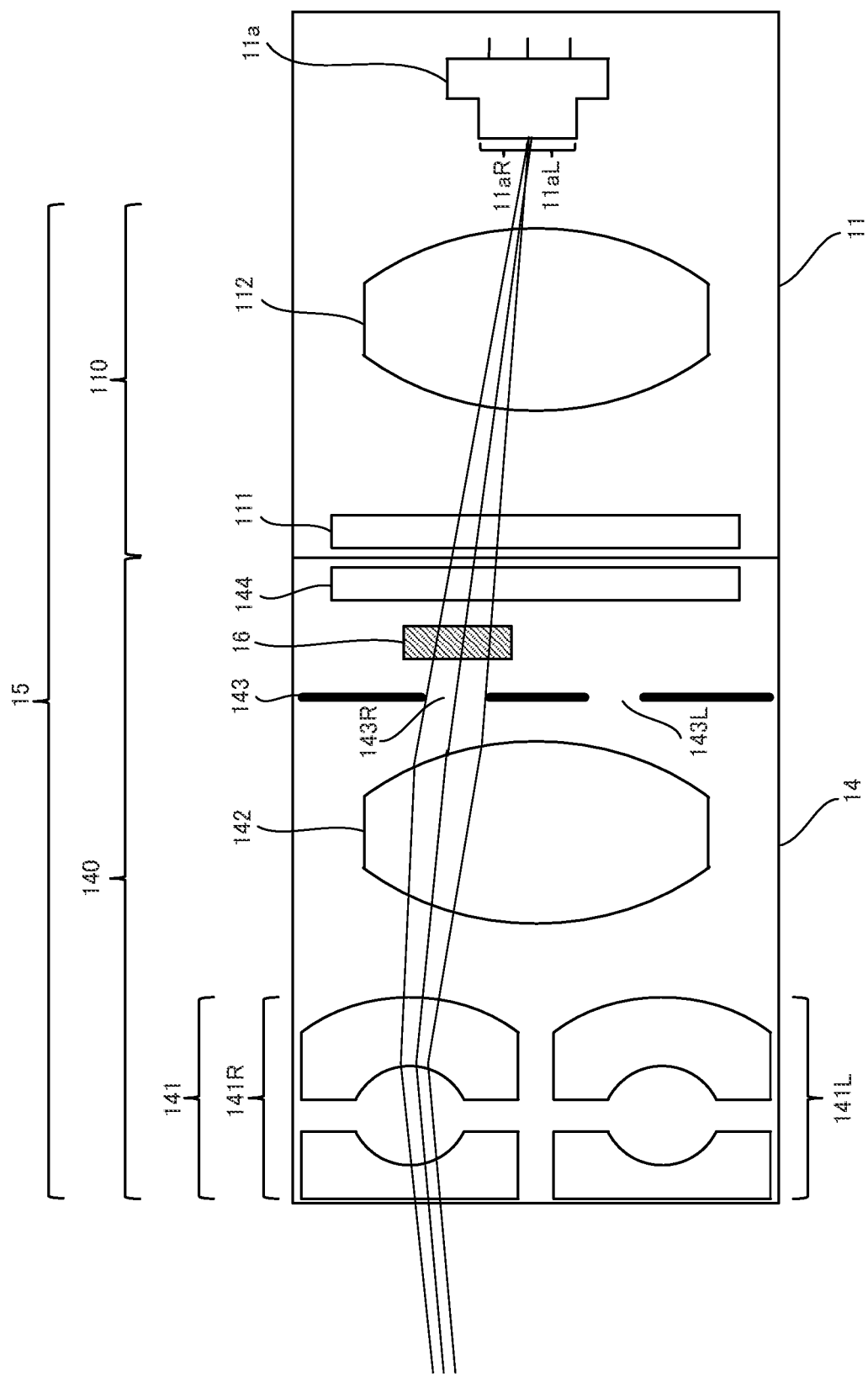
FIG. 5 is a diagram illustrating an arrangement example of the optical action member inserted into the first incident light path.

FIGS. 4 and 5 are diagrams illustrating arrangement examples of the optical action member 16 inserted into the first incident light path. The arrangement example of FIG. 4 illustrates a state in which the optical action member 16 is inserted between the binocular lens 141 (the right-eye lens 141R) and the coaxial lens 142. The arrangement example of FIG. 5 illustrates a state in which the optical action member 16 is inserted between the diaphragm 143 (the opening portion 143R) and the cover glass 144.

Figure 6:
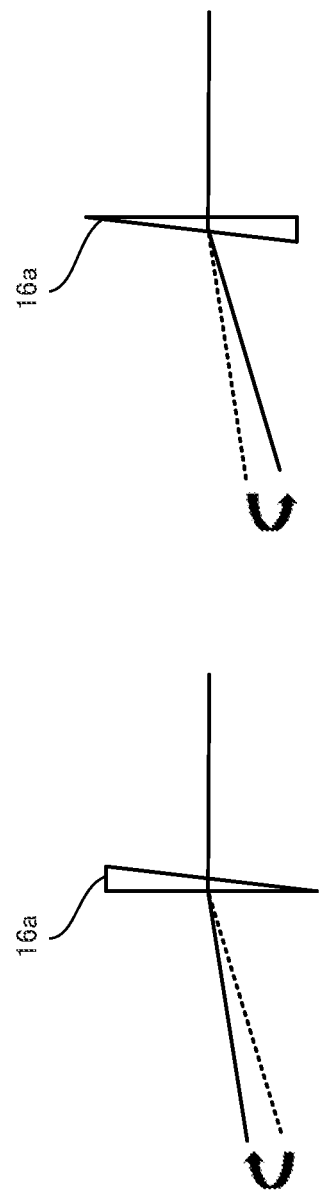
FIG. 6 is a diagram illustrating the action of a prism.

In the first embodiment, the optical action member 16 is a wedge-shaped prism 16*a*. The prism 16*a* has an action of bending a light beam in a direction in which the prism 16*a* becomes thicker. FIG. 6 is a diagram illustrating the action of the prism 16*a*. The left side of FIG. 6 illustrates an action in a case where the prism 16*a* is inserted into the first incident light path so that the thicker portion of the prism 16*a* is located on the outer side (the side away from the central axis of the coaxial lens 142). The right side of FIG. 6 illustrates an action in a case where the prism 16*a* is inserted into the first incident light path so that the thicker portion of the prism 16*a* is located on the inner side (the side closer to the central axis of the coaxial lens 142). It is noted that, in FIG. 6, schematically, the light beam of the first incident light path in a case where the prism 16*a* is not inserted into the first incident light path is indicated by a broken line, and the light beam of the first incident light path in a case where the prism 16*a* is inserted thereinto is indicated by a solid line.

As illustrated on the left side of FIG. 6, in a case where the prism 16a is inserted into the first incident light path so that the thicker portion of the prism 16a is located on the outer side, the light beam is bent outwards, that is, toward the thicker portion of the prism 16a, as indicated by an arrow, as compared with a case where the prism 16a is not inserted thereinto. As illustrated on the right side of FIG. 6, in a case where the prism 16a is inserted into the first incident light path so that the thicker portion of the prism 16a is located on the inner side, the light beam is bent inwards, that is, toward the thicker portion of the prism 16a, as indicated by an arrow, as compared with a case where the prism 16a is not inserted thereinto.

As described above, since the prism 16a has an action of bending the light beam in the direction in which the prism 16a becomes thicker, the convergence angle can be changed by inserting the prism 16a into the first incident light path as illustrated in FIG. 4 or 5 in the direction illustrated on the left side or the right side of FIG. 6. Specifically, the convergence angle is an angle formed by a main light beam of the first incident light path and a main light beam of the second incident light path. The main light beam of the first incident light path is a light beam passing through the center of the opening portion 143R of the diaphragm 143 and the center of the left-half area 11aL of the imaging area of the imaging element 11a. The main light beam of the second incident light path is a light beam passing through the center of the opening portion 143L of the diaphragm 143 and the center of the right-half area 11aR of the imaging area of the imaging element 11a.

Figure 7:
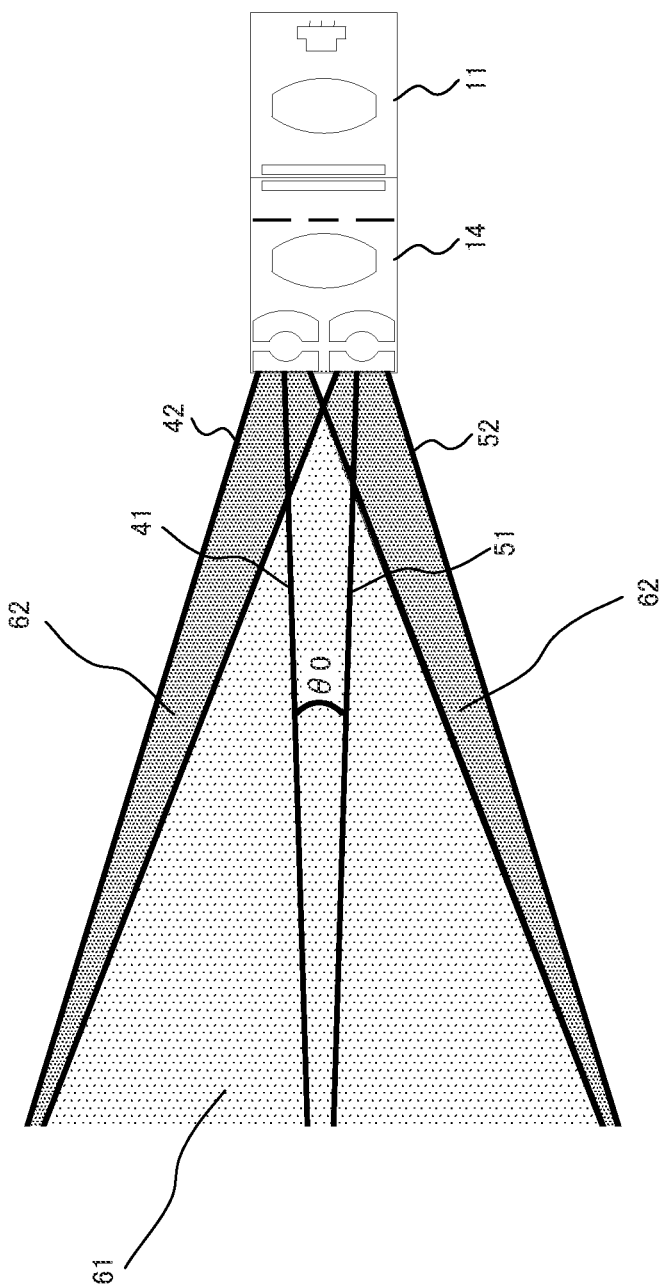
FIG. 7 is a diagram illustrating a convergence angle in a case where the prism is not inserted into the first incident light path.
Figure 8:
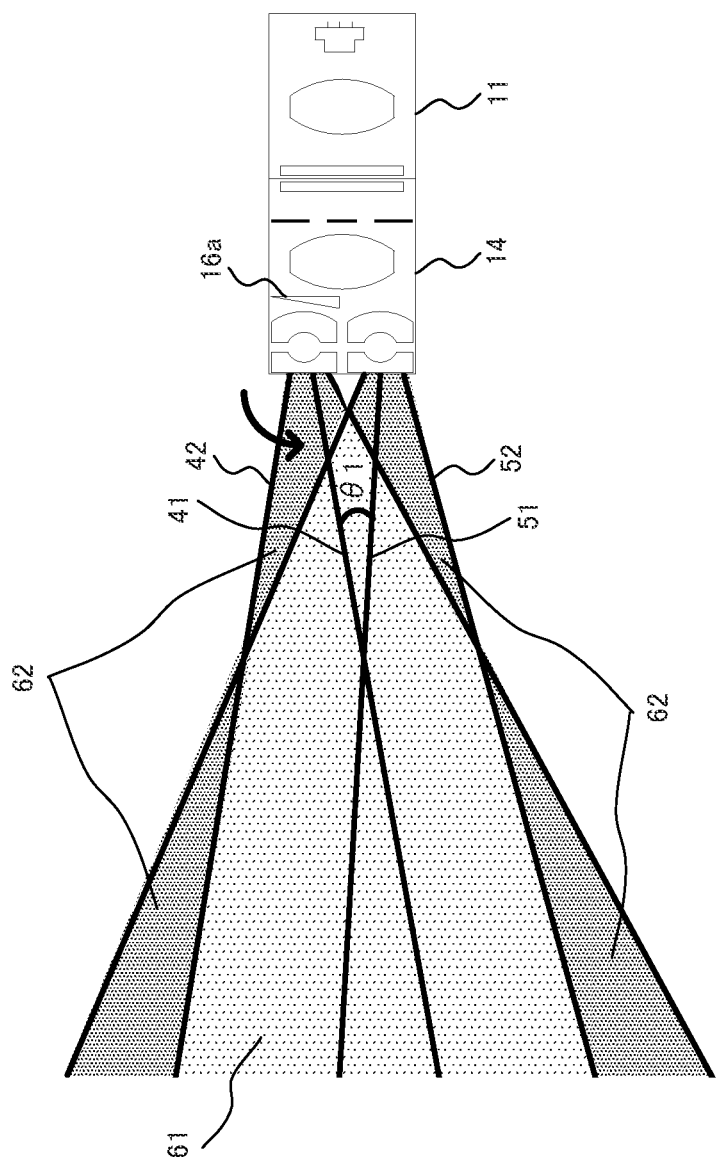
FIG. 8 is a diagram illustrating a convergence angle in a case where the prism is inserted into the first incident light path.

Here, an example of a change in the convergence angle due to insertion and removal of the prism 16a will be described with reference to FIGS. 7 and 8. FIG. 7 is a diagram illustrating a convergence angle in a case where the prism 16a is not inserted into the first incident light path. FIG. 8 is a diagram illustrating a convergence angle in a case where the prism 16a is inserted into the first incident light path.

As illustrated in FIG. 7, in a case where the prism 16a is not inserted into the first incident light path, a convergence angle, which is an angle formed by a main light beam 41 of the first incident light path and a main light beam 51 of the second incident light path, is θ0. On the other hand, as illustrated in FIG. 8, in a case where the prism 16a is inserted into the first incident light path as illustrated in FIG. 4 in the direction illustrated on the right side of FIG. 6 (the direction in which the inner side of the prism 16a becomes thicker), the direction of a visual field 42 of the first incident light path changes inwards as indicated by the arrow, and the convergence angle changes to θ1 (>θ0). In addition, a measurable area 61, which is an area where the visual field 42 of the first incident light path and a visual field 52 of the second incident light path overlap each other (alternatively, a non-measurable area 62, which is an area where the visual field 42 and the visual field 52 do not overlap each other), also changes. That is, the ratio of the measurable area 61 (or the non-measurable area 62) according to the subject distance also changes.

In the endoscope device 1, the control unit 34 controls the insertion/removal state of the prism 16a according to the subject distance, thereby making it possible to change the convergence angle to a convergence angle suitable for the subject distance (the convergence angle at which the ratio of the measurable area increases). Such control of the control unit 34 will be described with reference to FIGS. 9 and 10.

Figure 9:
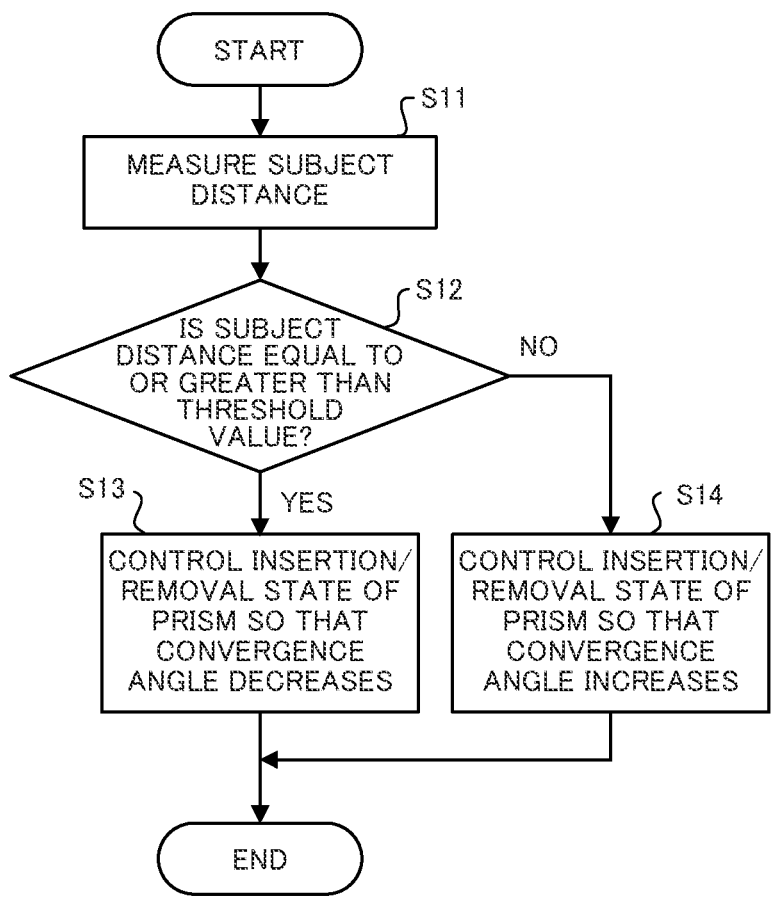
FIG. 9 is a flowchart illustrating processing in which a control unit controls the insertion/removal state of the prism.
Figure 10:
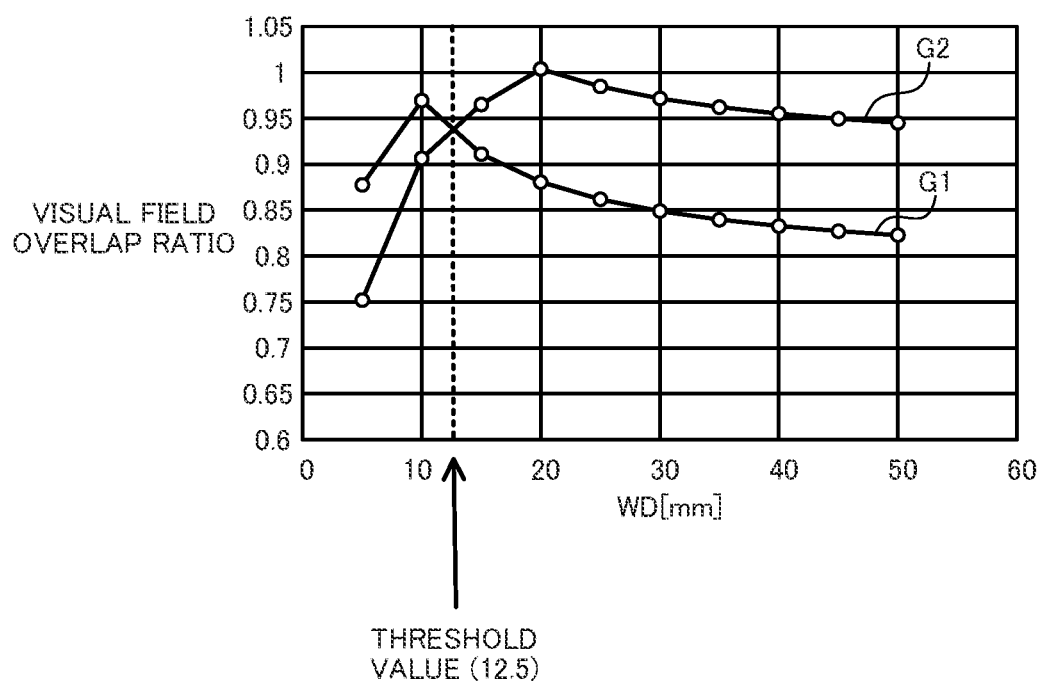
FIG. 10 is a diagram illustrating graphs obtained by plotting the ratios of measurable areas at respective subject distances in a case where the prism is inserted into the first incident light path and in a case where the prism is not inserted thereinto.

FIG. 9 is a flowchart illustrating processing in which control unit 34 controls the insertion/removal state of the prism 16a. This processing is automatically performed by the control unit 34, for example, after a stereo measurement mode is selected by a user and before a measurement target portion is instructed. The stereo measurement mode is a mode that enables the user to use a stereo measurement function. FIG. 10 is a diagram illustrating graphs G1 and G2 obtained by plotting the ratio (visual field overlap ratio) of the measurable area at each subject distance (each working distance (WD)) in a case where the prism 16a is inserted into the first incident light path (in the case of FIG. 8) and in a case where the prism 16a is not inserted thereinto (in the case of FIG. 7). G1 is a graph in a case where the prism 16a is inserted into the first incident light path, and G2 is a graph in a case where the prism 16a is not inserted into the first incident light path. It is noted that the convergence angle in a case where the prism 16a is inserted into the first incident light path is, for example, 3.8°, and the convergence angle in a case where the prism 16a is not inserted into the first incident light path is, for example, 1.42°.

In the processing illustrated in FIG. 9, first, the control unit 34 (the measurement calculation unit 34a) measures a subject distance based on an image output from the image generation unit 33 (S11). Next, the control unit 34 determines whether or not the subject distance measured in S11 is equal to or greater than a threshold value (S12). The threshold value is a subject distance when the ratio of a measurable area at a subject distance in a case where the prism 16a is inserted into the first incident light path is compared with the ratio of a measurable area at a subject distance in a case where the prism 16a is not inserted thereinto and the two ratios match each other or substantially match each other. According to the graphs G1 and G2 illustrated in FIG. 10, the threshold value is 12.5 mm.

When the determination result in S12 is YES, the control unit 34 controls the insertion/removal state of the prism 16a so that the convergence angle decreases (S13). That is, as illustrated in FIG. 7, control is performed so as to enter a state in which the prism 16a is not inserted into the first incident light path. As a result, the ratio of the measurable area can be increased as compared with the case where the prism 16a is inserted into the first incident light path (refer to the graph G2 equal to or greater than the threshold value in FIG. 10).

On the other hand, when the determination result in S12 is NO, the control unit 34 controls the insertion/removal state of the prism 16a so as to increase the convergence angle (S14). That is, as illustrated in FIG. 8, control is performed so as to enter a state in which the prism 16a is inserted into the first incident light path. As a result, it is possible to increase the ratio of the measurable area as compared with the case where the prism 16a is not inserted into the first incident light path (refer to the graph G1 less than the threshold value in FIG. 10).

When S13 or S14 ends, the processing illustrated in FIG. 9 ends.

As described above, according to the first embodiment, the ratio of the measurable area can be changed by changing the convergence angle according to the subject distance. Therefore, it is possible to prevent the ratio of the measurable area from decreasing by the subject distance, and it is possible to improve the usability of the stereo measurement function.

In the first embodiment, although the prism 16a is configured to be insertable into and removable from the first incident light path in the imaging optical system 15, the prism 16a may be configured to be insertable into and removable from the second incident light path in the imaging optical system 15, or the same may be configured to be insertable into and removable from each of the first incident light path and the second incident light path in the imaging optical system 15. In this case, the prism 16a inserted into the second incident light path may be inserted between the binocular lens 141 (the left-eye lens 141L) and the coaxial lens 142, or may be inserted between the diaphragm 143 (the opening portion 143L) and the cover glass 144. Furthermore, the direction of the prism 16a inserted into the second incident light path may be adjusted so that the thicker portion of the prism 16a is located on the inner side or on the outer side.

In a case where the prism 16a is configured to be insertable into and removable from each of the first incident light path and the second incident light path in the imaging optical system 15, the prism 16a inserted into the first incident light path and the prism 16a inserted into the second incident light path may be inserted in directions having opposite optical actions. That is, the direction of each prism 16a may be adjusted so that the thicker portion of the prism 16a is located on the inner side, or the thicker portion of the prism 16a is located on the outer side (in both cases, the prisms 16a are inserted in directions having opposite optical actions). In the former case, the convergence angle can be changed to a larger convergence angle, and in the latter case, the convergence angle can be changed to a smaller convergence angle.

Figure 11:
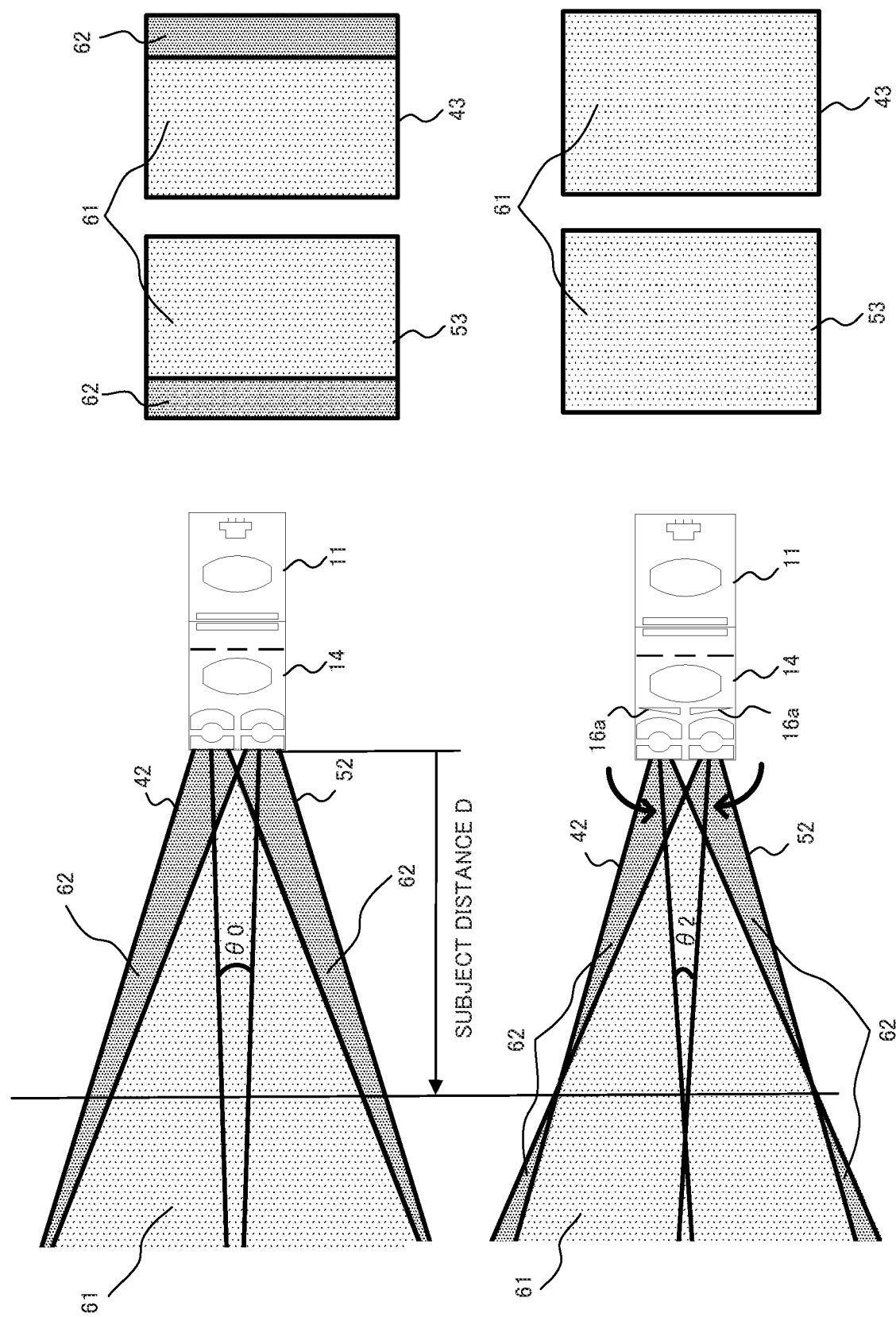
FIG. 11 is a diagram illustrating a specific example in a case where the prism is configured to be insertable into and removable from each of the first incident light path and a second incident light path in the imaging optical system.

FIG. 11 is a diagram illustrating a specific example in a case where the prism 16a is configured to be insertable into and removable from each of the first incident light path and the second incident light path in the imaging optical system 15. The upper side of FIG. 11 illustrates a case in which the prism 16a is not inserted into each of the first incident light path and the second incident light path, and the right side thereof illustrates images 43 and 53 of the visual fields 42 and 52 in which a subject at a subject distance D is imaged in this case. The lower side of FIG. 11 illustrates a case in which the prism 16a is inserted into each of the first incident light path and the second incident light path, and the right side thereof illustrates images 43 and 53 of the visual fields 42 and 52 in which the subject at the subject distance D is imaged in this case. It is noted that, in this specific example, the prism 16a inserted into the first incident light path and the prism 16a inserted into the second incident light path are inserted between the binocular lens 141 and the coaxial lens 142 so that the thicker portion of each prism 16a is located on the inner side.

In the specific example illustrated in FIG. 11, since the prism 16a is inserted into each of the first incident light path and the second incident light path, the visual field 42 of the first incident light path and the visual field 52 of the second incident light path both change inwards as indicated by arrows, and the convergence angle changes from θ0 to θ2 (>θ0), as compared with a case where the prism 16a is not inserted thereinto. It is noted that θ2 is larger than the convergence angle (refer to θ1 in FIG. 8) in a case where the prism 16a is inserted only into the first incident light path. Furthermore, the ratio of the measurable area 61 (or the non-measurable area 62) according to the subject distance also changes. For example, in the images 43 and 53 of the visual fields 42 and 52 in which the subject at the subject distance D is imaged, the ratio of the measurable area 61 in the case where the prism 16a is inserted is larger than that in the case where the prism 16a is not inserted. In this specific example, the ratio is 1 (100%).

In this manner, as in the specific example illustrated in FIG. 11, the prism 16a is configured to be insertable into and removable from each of the first incident light path and the second incident light path, thereby making it possible to change the convergence angle more greatly according to the subject distance.

Second Embodiment

In a second embodiment, the optical action member 16 in the endoscope device 1 according to the first embodiment is replaced with a parallel flat plate 16b.

The parallel flat plate 16b is disposed on the first incident light path in the imaging optical system 15. For example, the parallel flat plate 16b may be disposed between the binocular lens 141 (the right-eye lens 141R) and the coaxial lens 142 as in the optical action member 16 illustrated in FIG. 4, or the same may be disposed between the diaphragm 143 (the opening portion 143R) and the cover glass 144 as in the optical action member 16 illustrated in FIG. 5.

The parallel flat plate 16b includes two wedge-shaped prisms 16b1 and 16b2. The prisms 16b1 and 16b2 are, for example, the prism 16a described in the first embodiment. One prism 16b1 of the two prisms 16b1 and 16b2 is configured to be insertable into and removable from the second incident light path. Insertion and removal at this time are performed by an actuator (not illustrated) included in the optical adapter 14 under the control of the control unit 34. The prism 16b1 inserted into the second incident light path is inserted at a position symmetrical to the central axis of the coaxial lens 142. For example, when the parallel flat plate 16b is disposed between the binocular lens 141 (the right-eye lens 141R) and the coaxial lens 142, the prism 16b1 inserted into the second incident light path is inserted between the binocular lens 141 (the left-eye lens 141L) and the coaxial lens 142.

Figure 12:
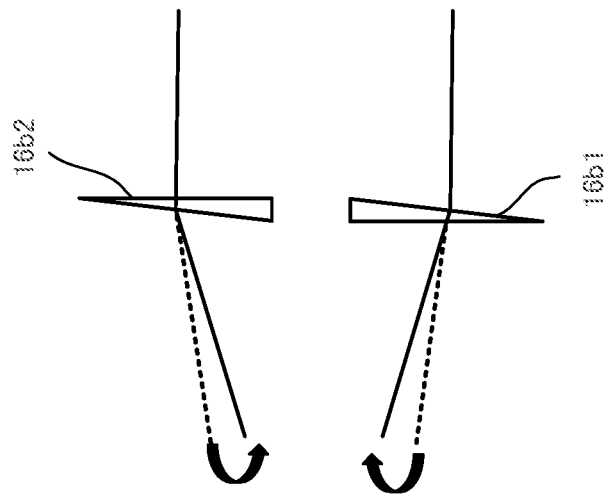
FIG. 12 is a diagram illustrating the action of a parallel flat plate (prisms)
Figure 12:
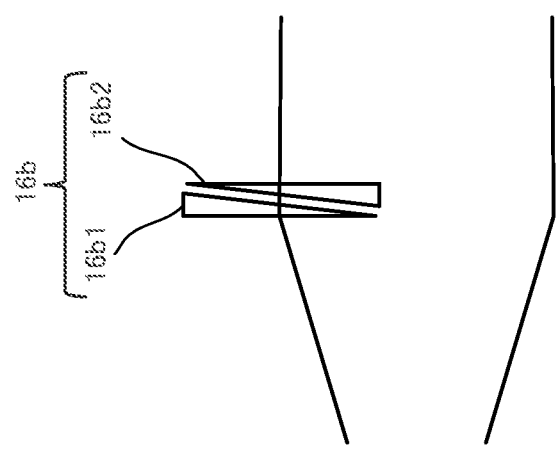

FIG. 12 is a diagram illustrating the action of the parallel flat plate 16b (the prisms 16b1 and 16b2). The left side of FIG. 12 illustrates the action in a case where the parallel flat plate 16b (the prisms 16b1 and 16b2) is disposed on the first incident light path. The right side of FIG. 12 illustrates the action of the prisms 16b1 and 16b2 in a case where one prism 16b1 of the parallel flat plate 16b is inserted into the second incident light path. It is noted that, on the left side of FIG. 12, the light beam of the first incident light path and the light beam of the second incident light path in the case where the parallel flat plate 16b (the prisms 16b1 and 16b2) is disposed on the first incident light path are schematically indicated by solid lines. Further, on the right side of FIG. 12, schematically, the light beam of the first incident light path and the light beam of the second incident light path in the case where the parallel flat plate 16b (the prisms 16b1 and 16b2) is disposed on the first incident light path (the case on the left side of FIG. 12) are indicated by dotted lines, and the light beam of the first incident light path and the light beam of the second incident light path in the case where one prism 16b1 of the parallel flat plate 16b is inserted into the second incident light path are indicated by solid lines.

As illustrated on the left side of FIG. 12, when the parallel flat plate 16b (the prisms 16b1 and 16b2) is disposed on the first incident light path, there is no action on the light beams of the first incident light path and the second incident light path. On the other hand, as illustrated on the right side of FIG. 12, when one prism 16b1 of the parallel flat plate 16b is inserted into the second incident light path, the light beam of the second incident light path is bent to the thicker portion (inner side) of the prism 16b1 as indicated by the arrow by the action of the prism 16b1, and the light beam of the first incident light path is bent to the thicker portion (inner side)

of the prism 16b2 as indicated by the arrow by the action of the other prism 16b2. It is noted that the action of each of the prisms 16b1 and 16b2 illustrated on the right side of FIG. 12 is the same as the action of the prism 16a described with reference to FIG. 11.

In the second embodiment, the control unit 34 controls the insertion/removal state of the prism 16b1 in the parallel flat plate 16b according to a subject distance, so that the convergence angle can be changed to a convergence angle suitable for the subject distance (the convergence angle at which the ratio of a measurable area becomes large). In such control of the control unit 34, similarly to the first embodiment, a subject distance is measured, and if the subject distance is equal to or greater than a threshold value, the insertion/removal state of the prism 16b1 may be controlled so that the convergence angle decreases, and if the subject distance is less than the threshold value, the insertion/removal state of the prism 16b1 may be controlled so that the convergence angle increases. That is, if the subject distance is equal to or greater than the threshold value, the prism 16b1 may be controlled so as to enter the state illustrated on the left side of FIG. 12, and if the subject distance is less than the threshold value, the prism 16b1 may be controlled so as to enter the state illustrated on the right side of FIG. 12. It is noted that the threshold value is a subject distance when the ratio of a measurable area at a subject distance in the case where the prism 16b1 is in the state illustrated on the left side of FIG. 12 is compared with the ratio of a measurable area at a subject distance in the case where the prism 16b1 is in the state illustrated on the right side of FIG. 12 and the two ratios match each other or substantially match each other.

As described above, the same effects as those of the first embodiment can be obtained by the second embodiment. Furthermore, in the second embodiment, only by inserting or removing one prism 16b1 of the two prisms 16b1 and 16b2 forming the parallel flat plate 16b, both the visual field 42 of the first incident light path and the visual field 52 of the second incident light path can be changed inwards, and the convergence angle can be changed to a larger convergence angle.

In the second embodiment, the prism 16b1 of the two prisms 16b1 and 16b2 forming the parallel flat plate 16b is inserted into and removed from the second incident light path, but the prism 16b2 may be inserted into and removed from the second incident light path. In this case, since the prism 16b2 is inserted into the second incident light path, the thicker portions of both the prism 16b1 of the first incident light path and the prism 16b2 of the second incident light path are respectively located on the outer side. Therefore, as compared with the case where the parallel flat plate 16b (the prisms 16b1 and 16b2) is in the state illustrated on the left side of FIG. 12, both the visual field 42 of the first incident light path and the visual field 52 of the second incident light path can be changed outwards, and the convergence angle can be changed to a smaller convergence angle.

In the second embodiment, although the parallel flat plate 16b is disposed on the first incident light path in the imaging optical system 15, the parallel flat plate 16b may be disposed on the second incident light path in the imaging optical system 15. For example, the parallel flat plate 16b may be disposed between the binocular lens 141 (the left-eye lens 141L) and the coaxial lens 142, or the same may be disposed between the diaphragm 143 (the opening portion 143L) and the cover glass 144. It is noted that, in this case, one of the two prisms 16b1 and 16b2 forming the parallel flat plate 16b is configured to be insertable into and removable from the first incident light path at a position symmetrical to the central axis of the coaxial lens 142.

Third Embodiment

In a third embodiment, the optical action member 16 in the endoscope device 1 according to the first embodiment is replaced with a liquid crystal prism 16c.

The liquid crystal prism 16c is disposed on the first incident light path in the imaging optical system 15. For example, the liquid crystal prism 16c may be disposed between the binocular lens 141 (the right-eye lens 141R) and the coaxial lens 142 as in the optical action member 16 illustrated in FIG. 4, or the same may be disposed between the diaphragm 143 (the opening portion 143R) and the cover glass 144 as in the optical action member 16 illustrated in FIG. 5.

The liquid crystal prism 16c is a wedge-type liquid crystal lens, and when a voltage is applied, an oriented state of liquid crystal molecules is changed, and a refraction angle of a light beam is changed. The voltage is applied to the liquid crystal prism 16c by a driver circuit (not illustrated) included in the optical adapter 14 under the control of the control unit 34. Hereinafter, the oriented state of the liquid crystal molecules when no voltage is applied to the liquid crystal prism 16c is referred to as a first oriented state, and the oriented state of the liquid crystal molecules when a voltage is applied to the liquid crystal prism 16c is referred to as a second oriented state.

Figure 13:
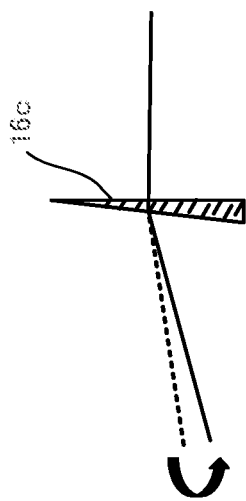
FIG. 13 is a diagram illustrating the action of a liquid crystal prism disposed on the first incident light path.
Figure 13:
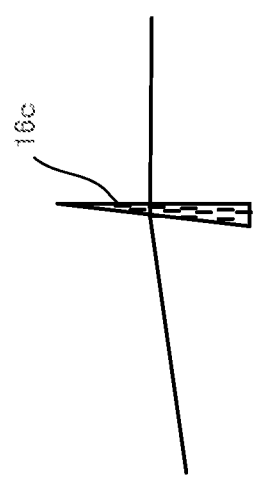

FIG. 13 is a diagram illustrating the action of the liquid crystal prism 16c disposed on the first incident light path. The left side of FIG. 13 illustrates the action of the liquid crystal prism 16c in the first oriented state, and the right side of FIG. 13 illustrates the action of the liquid crystal prism 16c in the second oriented state. It is noted that, on the left side of FIG. 13, the light beam of the first incident light path in a case where the liquid crystal prism 16c is in the first oriented state is schematically indicated by a solid line. On the right side of FIG. 13, schematically, the light beam of the first incident light path in the case where the liquid crystal prism 16c is in the first oriented state (the case on the left side of FIG. 13) is indicated by a dotted line, and the light beam of the first incident light path in a case where the liquid crystal prism 16c is in the second oriented state is indicated by a solid line.

As illustrated in FIG. 13, when the oriented state of the liquid crystal prism 16c disposed on the first incident light path is in the second oriented state (the case on the right side of FIG. 13), the light beam of the first incident light path is bent inwards as indicated by the arrow as compared with the case where the oriented state is the first oriented state (the case on the left side of FIG. 13). It is noted that such an action is similar to the action by the prism 16a illustrated on the right side of FIG. 6.

In the third embodiment, the control unit 34 controls the oriented state of the liquid crystal prism 16c according to a subject distance, so that the convergence angle can be changed to a convergence angle suitable for the subject distance (the convergence angle at which the ratio of the measurable area becomes large). In such control of the control unit 34, similarly to the first embodiment, a subject distance is measured, and if the subject distance is equal to or greater than a threshold value, the oriented state of the liquid crystal prism 16c is controlled so that the convergence angle decreases, and if the subject distance is less than the threshold value, the oriented state of the liquid crystal prism 16c is controlled so that the convergence angle increases.

That is, if the subject distance is equal to or greater than the threshold value, the control may be performed to enter the first oriented state illustrated on the left side of FIG. 13, and if the subject distance is less than the threshold value, the control may be performed to enter the second oriented state illustrated on the right side of FIG. 13. It is noted that the threshold value is a subject distance when the ratio of a measurable area at a subject distance in the case where the liquid crystal prism 16c is in the first oriented state illustrated on the left side of FIG. 13 is compared with the ratio of a measurable area at a subject distance in the case where the liquid crystal prism 16c is in the second oriented state illustrated on the right side of FIG. 13 and the two ratios match each other or substantially match each other.

As described above, the same effects as those of the first embodiment can be obtained by the third embodiment. In addition, in the third embodiment, since it is not necessary to provide a mechanical drive mechanism for changing the convergence angle, the optical adapter 14 can be miniaturized.

In the third embodiment, when the oriented state of the liquid crystal prism 16c disposed on the first incident light path is the second oriented state, the light beam of the first incident light path is bent inwards as compared with the case where the oriented state is the first oriented state, but the light beam may be bent outwards.

Further, in the third embodiment, although the liquid crystal prism 16c is disposed on the first incident light path in the imaging optical system 15, the liquid crystal prism 16c may be disposed on the second incident light path in the imaging optical system 15, or the same may be disposed on each of the first incident light path and the second incident light path in the imaging optical system 15. In this case, the liquid crystal prism 16c disposed on the second incident light path may be disposed between the binocular lens 141 (the left-eye lens 141L) and the coaxial lens 142, or the same may be disposed between the diaphragm 143 (the opening portion 143L) and the cover glass 144. Further, when the oriented state of the liquid crystal prism 16c disposed on the second incident light path is the second oriented state, the light beam of the second incident light path may be bent inwards or outwards as compared with the case where the oriented state is the first oriented state.

In a case where the liquid crystal prism 16c is disposed on each of the first incident light path and the second incident light path in the imaging optical system 15, the liquid crystal prism 16c in the second oriented state disposed on the first incident light path and the liquid crystal prism 16c in the second oriented state disposed on the second incident light path may have opposite optical actions. That is, when each of the liquid crystal prisms 16c is in the second oriented state, the light beam of the first incident light path and the light beam of the second incident light path may be bent inwards or outwards as compared with the case where each of the liquid crystal prisms 16c is in the first oriented state (in both cases, the optical action is in opposite directions). In the former case, the convergence angle can be changed to a larger convergence angle, and in the latter case, the convergence angle can be changed to a smaller convergence angle.

Fourth Embodiment

In a fourth embodiment, the diaphragm 143 also serves as the optical action member 16 in the endoscope device 1 according to the first embodiment.

In the fourth embodiment, each of the opening portions 143R and 143L of the diaphragm 143 is configured to be eccentric outwards. Eccentricity of the opening portions 143R and 143L is performed by an actuator (not illustrated) included in the optical adapter 14 under the control of the control unit 34.

Figure 14:
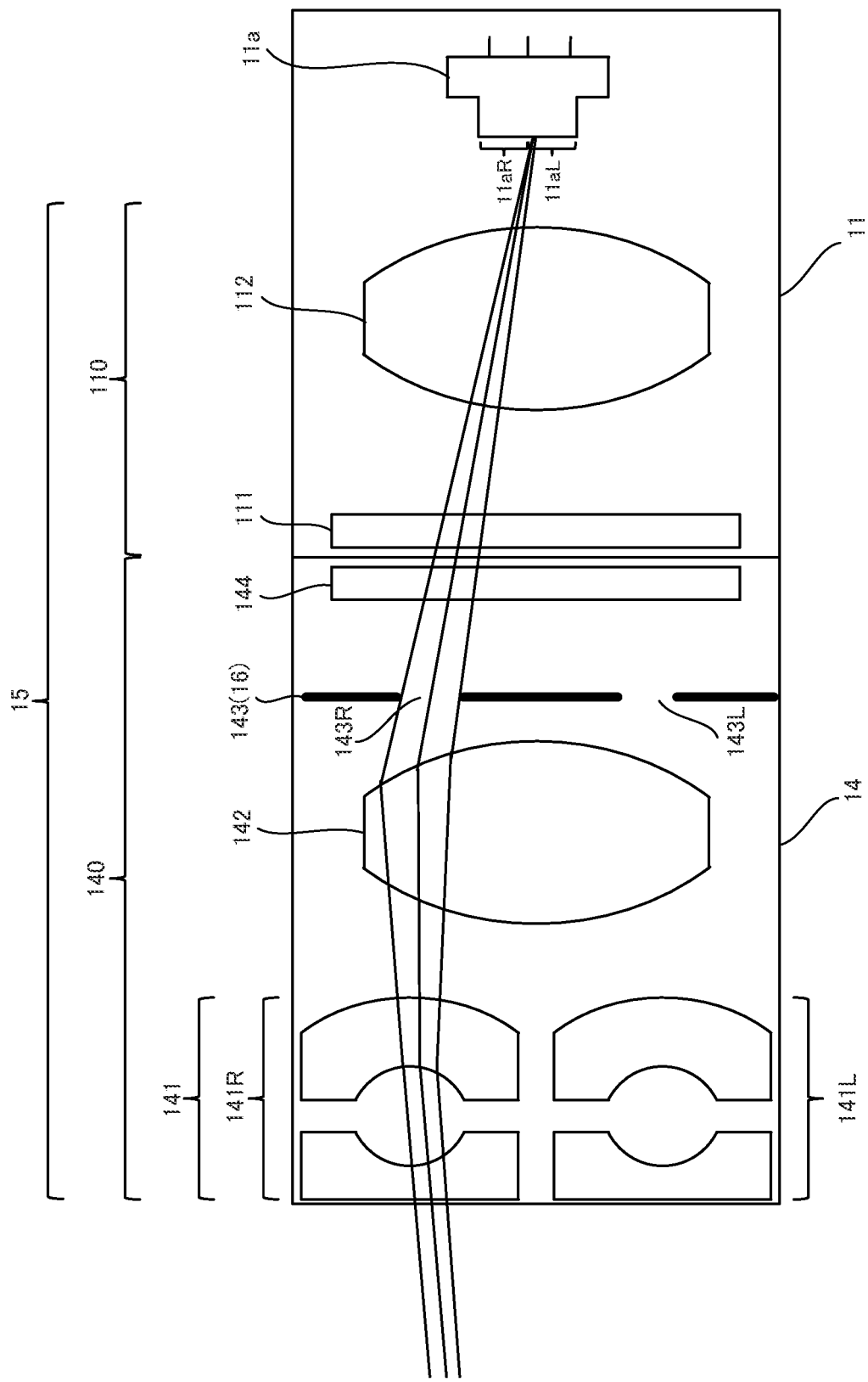
FIG. 14 is a diagram illustrating an imaging optical system in a state where each of opening portions of a diaphragm is eccentric outwards.

FIG. 14 is a diagram illustrating the imaging optical system 15 in a state where each of the opening portions 143R and 143L of the diaphragm 143 is eccentric outwards. In the case where each of the opening portions 143R and 143L of the diaphragm 143 is eccentric outwards as in the imaging optical system 15 illustrated in FIG. 14, both a visual field of the first incident light path and a visual field of the second incident light path are directed inwards as compared with the case where the opening portions 143R and 143L are not eccentric (the case of FIG. 3). It is noted that such an action is similar to the action of the prism 16a described with reference to FIG. 11.

In the fourth embodiment, the control unit 34 controls such an eccentric state of the diaphragm 143 according to a subject distance, thereby making it possible to change the convergence angle to a convergence angle suitable for the subject distance (the convergence angle at which the ratio of the measurable area becomes large). In such control of the control unit 34, similarly to the first embodiment, a subject distance is measured, and if the subject distance is equal to or greater than a threshold value, the eccentric state of the diaphragm 143 may be controlled so that the convergence angle decreases, and if the subject distance is less than the threshold value, the eccentric state of the diaphragm 143 may be controlled so that the convergence angle increases. That is, if the subject distance is equal to or greater than the threshold value, the diaphragm 143 (the opening portions 143R and 143L) may be controlled so as not to be eccentric (the state of FIG. 3), and if the subject distance is less than the threshold value, the diaphragm 143 (the opening portions 143R and 143L) may be controlled so as to be eccentric (the state of FIG. 14). It is noted that the threshold value is a subject distance when the ratio of a measurable area at a subject distance in the case where the diaphragm 143 is not in the eccentric state is compared with the ratio of a measurable area at a subject distance in the case where the diaphragm 143 is in the eccentric state and the two ratios match each other or substantially match each other.

As described above, the same effects as those of the first embodiment can be obtained by the fourth embodiment. In the fourth embodiment, since the diaphragm 143 also serves as the optical action member 16, for example, the number of components of the optical adapter 14 can be reduced as compared with the first to third embodiments.

In the fourth embodiment, each of the opening portions 143R and 143L of the diaphragm 143 is configured to be eccentric outwards, but may be configured to be eccentric inwards. In this case, in the case where each of the opening portions 143R and 143L is in the state of being eccentric inwards, both a visual field of the first incident light path and a visual field of the second incident light path are directed outwards as compared with the case where each of the opening portions is not in the state of being eccentric, and the convergence angle can be changed to a smaller convergence angle.

In the fourth embodiment, only one of the two opening portions 143R and 143L of the diaphragm 143 may be configured to be eccentric inwards or outwards. In this case, in a case where one of the two opening portions 143R and 143L is eccentric inwards or outwards, one of the visual field of the first incident light path and the visual field of the second incident light path is directed inwards or outwards as compared with a case where the one is not eccentric.

Therefore, although the change amount is small, the convergence angle can be changed to a larger or smaller convergence angle.

In the fourth embodiment, the diaphragm 143 having the two opening portions 143L and 143R can also be said to have a diaphragm having the opening portion 143L and a diaphragm having the opening portion 143R. In this case, it can be said that in the endoscope device 1 according to the fourth embodiment, the imaging optical system 15 includes a diaphragm disposed on each of the first incident light path and the second incident light path, one or each of the diaphragms also serves as the optical action member 16, the diaphragm also serving as the optical action member 16 can be made eccentric, and the control unit 34 changes the convergence angle by controlling the eccentric state of the diaphragm also serving as the optical action member 16 based on the measurement result of the measurement calculation unit 34a.

Although the first to fourth embodiments have been described above, in each embodiment, the main body unit 30 may include a communication interface connected to a network in a wired or wireless manner and configured to perform communication with an external device (server or the like) connected to the network. As a result, for example, data acquired by the endoscope device 1 can be shared on the cloud.

Furthermore, in each embodiment, a function of a part (for example, the control unit 34 or the like) of the main body unit 30 may be implemented by an external control device, and the endoscope device 1 may be implemented as an endoscope system including an endoscope device and a control device. In this case, the control device may be implemented by a computer 200 illustrated in FIG. 15.

Figure 15:
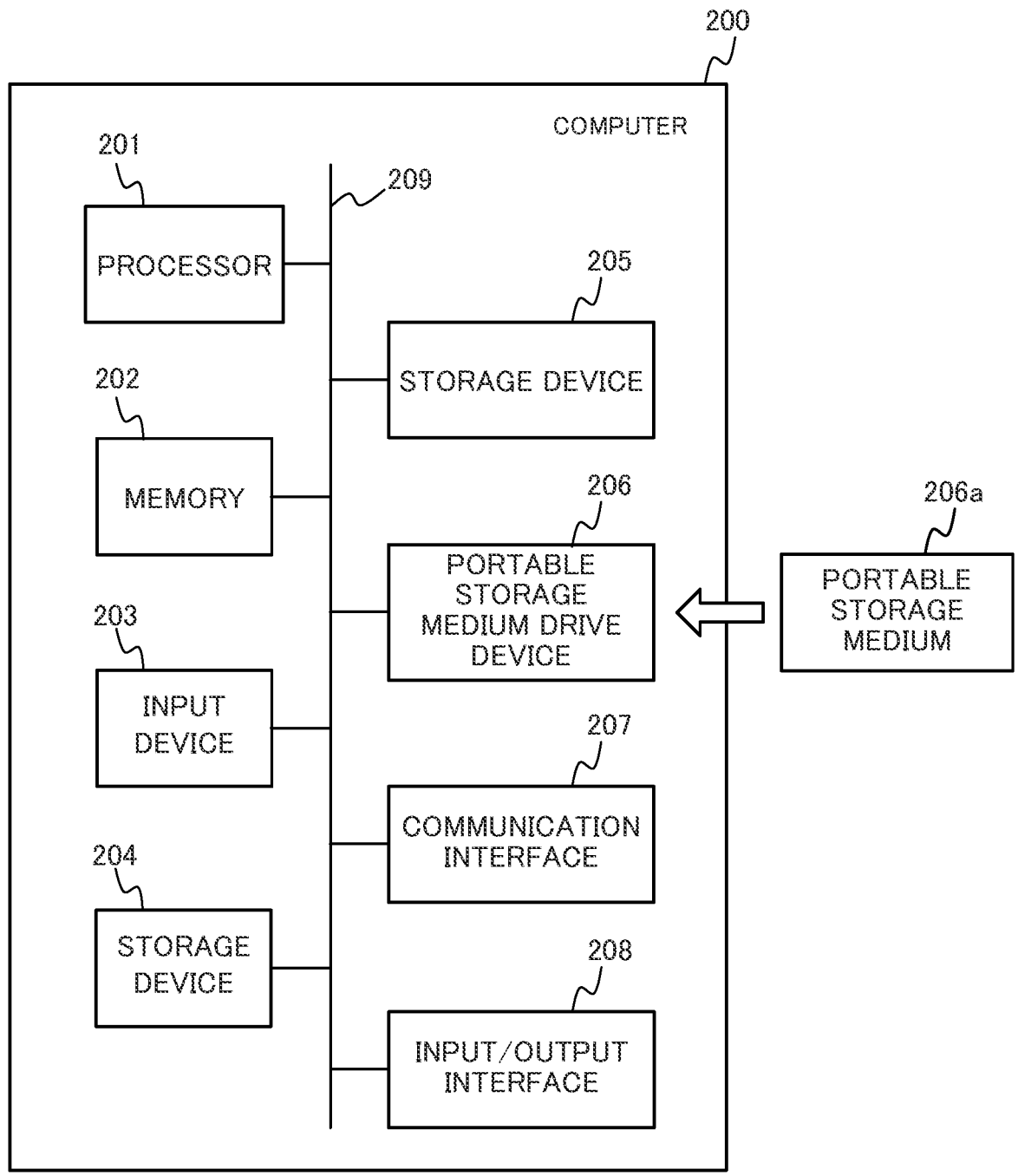
FIG. 15 is a diagram illustrating a hardware configuration of a computer.

FIG. 15 is a diagram illustrating a hardware configuration of the computer 200. The computer 200 illustrated in FIG. 15 includes a processor 201, a memory 202, an input device 203, an output device 204, a storage device 205, a portable storage medium drive device 206, a communication interface 207, and an input/output interface 208, and each of the devices is connected to a bus 209 and can transmit and receive data to and from each other.

The processor 201 is a CPU or the like, and performs various types of processing by executing a program such as an operating system (OS) or an application. The memory 202 includes an RAM and an ROM. A part of the program executed by the processor 201 and the like is temporarily stored in the RAM. The RAM is also used as a work area of the processor 201. The ROM stores the program executed by the processor 201, various data necessary for executing the program, and the like.

The input device 203 is a keyboard, a mouse, a touch panel, a joystick, or the like. The output device 204 is a display device such as an LCD.

The storage device 205 is a device that stores data, and is an HDD, an SSD, or the like. The portable storage medium drive device 206 drives a portable storage medium 206a, accesses the stored contents, and reads and writes data. The portable storage medium 206a is a memory device, a flexible disk, an optical disk, a magneto-optical disk, or the like. The portable storage medium 206a also includes a compact disc read only memory (CD-ROM), a digital versatile disc (DVD), a Blu-ray disc, a USB memory, an SD card memory, and the like.

The communication interface 207 is an interface connected to a network in a wired or wireless manner and configured to perform communication with the external device connected to the network. The input/output interface 208 is an interface connected to an external device such as an endoscope device and configured to input/output data to/from the external device.

In the above-described computer 200, the program executed by the processor 201 and various data necessary for executing the program are stored not only in the memory 202, and but may be stored in the storage device 205 or the portable storage medium 206a. In addition, the program executed by the processor 201 and various data necessary for executing the program may be stored in one or more of the memory 202, the storage device 205, and the portable storage medium 206a from an external device via the network and the communication interface 207.

In addition, the computer 200 is not limited to the one illustrated in FIG. 15, and may be configured to include a plurality of some components illustrated in FIG. 15 or may be configured without some components. For example, the computer 200 may include a plurality of processors.

Furthermore, the computer 200 may include hardware such as a microprocessor, ASIC, FPGA, a digital signal processor (DSP), and a programmable logic device (PLD). For example, the processor 201 may be implemented using at least one of these pieces of hardware.

Although embodiments of the present invention have been described above, the present invention is not limited to the above-described embodiments, and various improvements and changes can be made without departing from the gist of the present invention.

What is claimed is:

1. An endoscope device comprising:
an imaging optical system including two incident light paths formed by two optical systems respectively having optical axes eccentric with respect to an imaging center of an imaging element;
an optical action member configured to change a convergence angle; and
a processor comprising hardware, the processor being configured to control a state of the optical action member in the imaging optical system, wherein the processor is further configured to:
measure a distance to a subject, and
change, based on a measurement result, the convergence angle by controlling the state of the optical action member in the imaging optical system,
wherein the optical action member is a parallel flat plate disposed on one of the two incident light paths,
the parallel flat plate includes two prisms, and one of the two prisms is insertable into and removable from the other of the two incident light paths, and
the processor changes, based on the measurement result, the convergence angle by controlling an insertion/removal state of the one prism in the parallel flat plate.

2. The endoscope device according to claim 1,
wherein the optical action member is a prism insertable into and removable from one or each of the two incident light paths, and
wherein the processor changes, based on the measurement result, the convergence angle by controlling an insertion/removal state of the prism.

3. The endoscope device according to claim 2, wherein the optical action member is a prism insertable into and removable from one of the two incident light paths.

4. The endoscope device according to claim 2, wherein the prism inserted into each of the two incident light paths has opposite optical actions.

5. The endoscope device according to claim 1, wherein the processor controls, when the measured distance is equal to or greater than a threshold value, the state of the optical action member so that the convergence angle decreases, and controls, when the measured distance is less than the threshold value, the state of the optical action member so that the convergence angle increases.

6. An endoscope system comprising:
an endoscope device; and
a controller comprising hardware,
wherein the endoscope device includes:
   an imaging optical system including two incident light paths formed by two optical systems respectively having optical axes eccentric with respect to an imaging center of an imaging element; and
   an optical action member configured to change a convergence angle, and
wherein the controller is configured to:
   measure a distance to a subject, and
   change, based on a measurement result, the convergence angle by controlling a state of the optical action member in the imaging optical system,
the optical action member is a parallel flat plate disposed on one of the two incident light paths,
the parallel flat plate includes two prisms, and one of the two prisms is insertable into and removable from the other of the two incident light paths, and
the controller changes, based on the measurement result, the convergence angle by controlling an insertion/removal state of the one prism in the parallel flat plate.

7. The endoscope system according to claim 6, wherein the endoscope device includes an optical adapter.

8. A convergence angle changing method comprising:
measuring a distance to a subject; and
changing a convergence angle by controlling, based on the distance, a state of an optical action member in an imaging optical system including two incident light paths formed by two optical systems respectively having optical axes eccentric with respect to an imaging center of an imaging element,
wherein the optical action member is a parallel flat plate disposed on one of the two incident light paths,
the parallel flat plate includes two prisms, and one of the two prisms is insertable into and removable from the other of the two incident light paths, and
the convergence angle changing method further comprising changing, based on the measurement result, the convergence angle by controlling an insertion/removal state of the one prism in the parallel flat plate.

9. A non-transitory computer-readable medium having a program stored therein and configured to cause a processor to at least execute processing of:
measuring a distance to a subject; and
changing a convergence angle by controlling, based on the distance, a state of an optical action member in an imaging optical system including two incident light paths formed by two optical systems respectively having optical axes eccentric with respect to an imaging center of an imaging element,
wherein the optical action member is a parallel flat plate disposed on one of the two incident light paths,
wherein the parallel flat plate includes two prisms, and one of the two prisms is insertable into and removable from the other of the two incident light paths, and
wherein the non-transitory computer-readable medium having the program stored therein and configured to cause the processor to execute processing of
changing, based on the measurement result, the convergence angle by controlling an insertion/removal state of the one prism in the parallel flat plate.

10. An endoscope device comprising:
an imaging optical system including two incident light paths formed by two optical systems respectively having optical axes eccentric with respect to an imaging center of an imaging element;
at least one optical action member configured to change a convergence angle, the optical action member being insertable into and removable from one or each of the two incident light paths; and
a processor comprising hardware, the processor being configured to:
   control an insertion/removal state of the optical action member in the imaging optical system, and
   change the convergence angle by changing the insertion/removal state of the optical action member,
wherein the optical action member is a parallel flat plate disposed on one of the two incident light paths,
wherein the parallel flat plate includes two prisms, and one of the two prisms is insertable into and removable from the other of the two incident light paths, and
wherein the processor changes, based on the measurement result, the convergence angle by controlling an insertion/removal state of the one prism in the parallel flat plate.

11. The endoscope device according to claim 10, further comprising an optical adapter.

* * * * *